US012748528B2

(12) United States Patent
Mulier et al.

(10) Patent No.: US 12,748,528 B2
(45) Date of Patent: Sep. 29, 2026

(54) METHOD AND CIRCUIT FOR REDUCING PROCESSING LATENCY

(71) Applicant: Arm Limited, Cambridge (GB)

(72) Inventors: Emma Lynn Mulier, Gedera (IL); Elliot Maurice Simon Rosemarine, Cambridge (GB); Thomas James Cooksey, Fulbourn (GB)

(73) Assignee: Arm Limited, Cambridge (GB)

( * ) Notice: Subject to any disclaimer, the term of this patent is extended or adjusted under 35 U.S.C. 154(b) by 34 days.

(21) Appl. No.: 18/591,662

(22) Filed: Feb. 29, 2024

(65) Prior Publication Data

US 2025/0278189 A1 Sep. 4, 2025

(51) Int. Cl.
*G06F 3/06* (2006.01)

(52) U.S. Cl.
CPC .......... *G06F 3/0611* (2013.01); *G06F 3/0673* (2013.01)

(58) Field of Classification Search
CPC ............................ G06F 3/0611; G06F 3/0673
See application file for complete search history.

(56) References Cited

U.S. PATENT DOCUMENTS

| | | | | |
|---|---|---|---|---|
| 6,578,107 B1 * | 6/2003 | Anderson | G06F 3/0656 | 711/113 |
| 7,130,956 B2 * | 10/2006 | Rao | G06F 12/0897 | 711/3 |
| 9,244,742 B2 * | 1/2016 | Gulati | H04L 47/805 | |
| 2004/0243660 A1 * | 12/2004 | Chew | G06F 9/5061 | 709/200 |
| 2014/0281327 A1 * | 9/2014 | Dong | G11C 29/50012 | 711/167 |
| 2016/0371014 A1 * | 12/2016 | Roberts | G06F 3/0688 | |
| 2018/0341602 A1 * | 11/2018 | Venkataraman | G06F 13/1673 | |
| 2019/0243557 A1 * | 8/2019 | Joshi | G06F 3/0647 | |
| 2024/0394194 A1 * | 11/2024 | Tamilarasan | G06F 12/0891 | |

* cited by examiner

*Primary Examiner* — Zhuo H Li
(74) *Attorney, Agent, or Firm* — DeWitt LLP

(57) ABSTRACT

Systems, devices, and computer-implemented methods of arranging a set of descriptors in storage for access by a processor when executing a processing operation. A method includes providing a set of descriptors; each descriptor comprising address and attribute information for a referenced entity in storage; providing a hierarchical access structure comprising a plurality of tiers in storage; for each descriptor, determining a latency attribute of the entity referenced by the descriptor; the latency attribute being indicative of a relative impact of accesses of the referenced entity on the overall processing latency of the processing operation; and for each descriptor, arranging the descriptor in the hierarchical access structure based on the latency attribute.

14 Claims, 4 Drawing Sheets

METHOD AND CIRCUIT FOR REDUCING PROCESSING LATENCY

TECHNICAL FIELD

The present techniques relate to a method and circuitry for reducing processing latency. In particular, the present techniques relate to reducing processing latency of a processing operation performed by a processor.

BACKGROUND

Some processing circuits (e.g. a central processor unit (CPU) or graphics processor unit (GPU)) may experience performance issues. For example, a processing operation can be delayed by latency when retrieving data from storage.

There is a need for mitigation action to address such performance issues.

The present techniques relate to reducing processing latency or improving known processing latency reduction techniques.

SUMMARY

According to a first approach of present techniques, there is provided a computer-implemented method of arranging a set of descriptors in storage for access by a processor when executing a processing operation, the method comprising: providing a set of descriptors; each descriptor comprising address and attribute information for a referenced entity in storage; providing a hierarchical access structure comprising a plurality of tiers in storage; for each descriptor, determining a latency attribute of the entity referenced by the descriptor; the latency attribute being indicative of a relative impact of accesses of the referenced entity on the overall processing latency of the processing operation; and for each descriptor, arranging the descriptor in the hierarchical access structure based on the latency attribute.

In some implementations, the latency attribute is indicative of an effect on an overall processing latency of the processing operation attributable to that referenced entity.

In some implementations, arranging the descriptor in the hierarchical access structure based on the latency attribute comprises: arranging the descriptor such that descriptors having latency attributes being indicative of a high relative impact of accesses of the referenced entity on the overall processing latency of the processing operation are arranged in a relatively high-order tier; and descriptors having latency attributes being indicative of a low relative impact of accesses of the referenced entity on the overall processing latency of the processing operation are arranged in a relatively low-order tier.

In some implementations, the processing latency associated with accessing a tier of the hierarchical access structure is correlated with a number of memory accesses required to access said tier.

In some implementations, a number of memory accesses associated with accessing a first tier is less than a number of memory accesses associated with accessing a second tier.

In some implementations, frequently accessed descriptors are arranged in first tiers of the hierarchical access structure.

In some implementations, the latency attribute is an estimated access frequency of the entity.

In some implementations, the latency attribute is a source of the entity.

In some implementations, the latency attribute is a permanence of the entity.

In some implementations, the hierarchical access structure comprises a plurality of resource tables configured to comprise descriptors.

In some implementations, providing a hierarchical access structure comprises: providing a plurality of resource tables; allocating a first resource table to a first access tier; allocating a second resource table to the first access tier; populating the second resource table with descriptors of fields of a third resource table to allocate the third resource table to a second access tier.

In some implementations, for a referenced entity having a latency attribute above a predetermined threshold, the descriptor is arranged in the first resource table.

In some implementations, for a referenced entity having a latency attribute below a predetermined threshold, the descriptor is arranged in the third resource table.

According to a further approach of present techniques, there is provided a host processor configured to execute a driver to arrange a set of descriptors in storage for access by a processor when executing a processing operation; the driver being configured to: provide a set of descriptors of a processing operation; each descriptor comprising address and attribute information for a referenced entity in storage; provide a hierarchical access structure comprising a plurality of tiers in storage; for each descriptor, determine a latency attribute of the entity referenced by the descriptor; the latency attribute being indicative of a relative impact of accesses of the referenced entity on the overall processing latency of the processing operation; and for each descriptor, arrange the descriptor in the hierarchical access structure based on the latency attribute.

According to a further approach of present techniques, there is provided a processor configured to: receive a plurality of descriptors arranged in a hierarchical access structure according to a latency attribute of each descriptor; and perform a processing operation; wherein performing a processing operation comprises: retrieving a referenced entity in storage by accessing a descriptor of the plurality of descriptors arranged in a hierarchical access structure according to a latency attribute of each descriptor; processing the referenced entity to produce a second entity.

In some implementations, performing a processing operation further comprises: writing the second entity to storage by accessing the descriptor of the plurality of descriptors arranged in a hierarchical access structure according to a latency attribute of each descriptor.

In some implementations, the processor comprises a central processor unit, a neural processing unit or a graphics processor unit.

According to a further approach of present techniques, there is provided a system comprising: the processor of an approach of present techniques, implemented in at least one packaged chip; at least one system component; and a board, wherein the at least one packaged chip and the at least one system component are assembled on the board.

According to a further approach of present techniques, there is provided a chip-containing product comprising the system of an approach of present techniques assembled on a further board with at least one other product component.

According to a further approach of present techniques, there is provided a software product configured to arrange a set of descriptors in storage for access by a processor when executing a processing operation according to the method of an approach of present techniques.

According to a further approach of present techniques, there is provided a non-transitory computer-readable medium to store the software product of an approach of present techniques.

According to a further approach of present techniques, there is provided a non-transitory computer-readable medium to store computer-readable code for fabrication of circuitry for arranging a descriptor in storage according to an approach of present techniques.

BRIEF DESCRIPTION OF THE DRAWINGS

Implementations of the disclosed technology will now be described, by way of example only, with reference to the accompanying drawings, in which.

DETAILED DESCRIPTION

Figure 1:
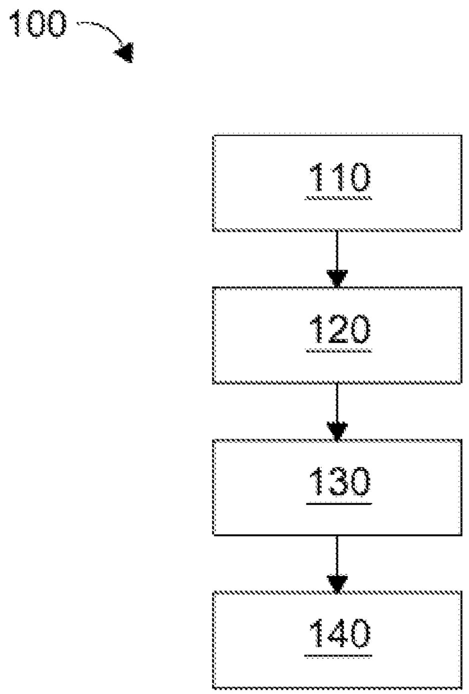
FIG. 1 schematically shows a flowchart illustrating a method of reducing processing latency according to an implementation of present techniques.

To execute processing operations, a processor must retrieve data from storage, or memory. On initiation of a particular processing operation, a series of buffers are allocated in storage to receive various entities required to execute the processing operation. At this stage, input data is stored in a buffer in storage, and a buffer configured to receive the output data is allocated. Further, permanent data resources relating to the processing, such as weights of a neural network, are stored in buffers. Furthermore, buffers configured to receive transient data resources, such as interim computation results, are allocated. Each buffer is accessed via a descriptor comprising a storage address of the buffer and other necessary ancillary information required to access the data stored in the buffer.

The set of descriptors associated with the series of buffers are also generated on initiation of the processing operation. The descriptors may be placed in storage for access by the processor via registers. In such an arrangement retrieving each descriptor requires accessing storage. Each time storage is accessed, in other words, for each memory access, the processor spends an amount of time waiting for the descriptor to be retrieved. In this way, retrieving each descriptor incurs a processing latency. Reducing latency is desirable for fast and efficient processing. Accordingly, reducing a number of memory accesses required to retrieve a descriptor for accessing a buffer is desirable.

To eliminate latency associated with accessing storage to retrieve descriptors, all the descriptors could be held in registers provided to the processor. In this way, the number of memory accesses required to retrieve a descriptor would be zero so latency would be minimised. However, due to the large number of buffers, and therefore descriptors, that are required for a processing operation, such an arrangement would require impractical amount of circuit area and bus traffic for the configuration of such registers. Accordingly, an alternative solution is required.

One alternative comprises providing the processor with a smaller number of registers than the number of descriptors by arranging the descriptors in sets (e.g., tables) and providing the processor with registers comprising pointers to locations in storage where the descriptor sets are stored. In this case, to retrieve a descriptor, one memory access is required as each pointer in a register points directly to the descriptor set required. As such, by arranging descriptors in sets in storage accessible via a single level of indirection, a compromise between latency and the circuit area and bus traffic required to access the data may be provided.

To reduce a number of registers required, thereby reducing a circuit area and bus traffic, a number of descriptor sets may be minimised. However, due to the different types of descriptors provided, governed by the nature of the buffers described by the descriptors, it is advantageous to split the descriptors into a plurality of sets. Moreover, a structure comprising a single, or a low number of, descriptor sets may be rigid, difficult to manipulate and provide limited support for software features. In particular, such a structure may not be compatible with the required high-level application programming interfaces (APIs) that describe the operations performed by the hardware of the processor. These APIs typically recognise a data structure comprising resources arranged in multiple sets (or tables). For example, Vulkan API requires a minimum of four sets of descriptors and it is anticipated that future versions of that API may require at least seven sets.

Accordingly, a plurality of sets of descriptors is required. However, by providing all the descriptor sets in a single level, each descriptor set requires a register in storage (e.g., static random-access memory (SRAM)) to store the pointer needed to access the descriptor set. Accordingly, the more descriptor sets are required, the more storage is required, increasing a hardware requirement.

In addition, for modern processing units, e.g., graphics processing units, which are multi-cored, the data in the registers must be communicated to each core that requires access to the descriptor sets. Where each descriptor set requires a register due to the single level of indirection, the amount of communication on an internal chip network or bus required to propagate the registers through the cores may increase. As such, an arrangement of descriptors in a plurality of sets accessible via one level of indirection may require impractical amount of circuit area and bus traffic.

As such, arranging descriptor sets in storage accessible via one level of indirection may limit a number of descriptor sets that can be supported for a given hardware requirement and performance. Accordingly, a storage structure of descriptors comprising multiple levels of indirection may be needed to ensure compatibility between software and hardware.

However, a storage structure of descriptors comprising multiple levels of indirection may increase a processing latency incurred when retrieving a descriptor by increasing a number of memory accesses required to retrieve the descriptor. The more levels of indirection that exist between the pointer in the register and the descriptor, the more memory accesses are required, and therefore the more latency is incurred. Waiting to retrieve each descriptor from a multi-layered data access structure via a plurality of levels of indirection when accessing a buffer may be a critical source of latency. In processors capable of multi-threading, the effect of such latency may be hidden if parallelising the work is feasible. However, if the work is not parallelisable, or if the processor is not multi-threaded, the effect on the overall processing latency may be unacceptable.

To find a compromise between a high latency multi-level access structure and a low latency but rigid and limiting structure, present techniques provide a method of arranging a set of descriptors in a hierarchical access structure in storage according to a latency attribute of each entity referenced by each descriptor such that processing latency of the processing operation as a whole is reduced. In particular, present techniques disclose a method of determining a latency attribute of the entity referenced by the descriptor; and arranging the descriptor in the hierarchical access structure according to the latency attribute.

By identifying descriptors that reference entities with a high impact on the overall latency of the processing operation, and placing these descriptors in a tier of the hierarchical access structure accessible via relatively low number of levels of indirection, and identifying descriptors that reference entities with a low impact on the overall latency of the processing operation, and placing these descriptors in a tier of the hierarchical access structure accessible via a greater number of levels of indirection, a processing latency is reduced and a flexible and API compatible structure of descriptors is provided.

With reference to FIG. 1, there is provided a flowchart schematically illustrating a computer-implemented method 100 of reducing processing latency of a processing operation by arranging a set of descriptors in storage for access by a processor according to an implementation of present techniques.

Method 100 comprises, at 110, providing a set of descriptors; each descriptor comprising address and attribute information for a referenced entity in storage. At 120, the method 100 comprises providing a hierarchical access structure in storage. The hierarchical access structure may comprise a plurality of tiers. A processing latency associated with accessing a first tier (e.g., a higher-order tier) may be less than a processing latency associated with accessing a second tier (e.g., a lower-order tier). In this way, a first access tier having a low latency access path may be provided, and a second access tier having a high latency access path may be provided. It will be appreciated that further tiers associated with further latency may be provided. The processing latency associated with a tier may correspond or relate to a number of memory accesses required to access said tier.

A number of memory accesses required to access a tier may be configured using a set of interlinked resource tables arranged to receive descriptors. For example, a first resource table may be populated with descriptors to fields of a second resource table. In this way, the second resource table is demoted by one tier below the first resource table so that accessing a descriptor placed in the second resource table may involve an additional memory access, compared with a descriptor accessible via only one resource table. If the second resource table is populated with descriptors to fields of a third resource table, the third resource table is demoted a further one tier below the second resource table. Accessing said third tier may involve an additional memory access compared with the second resource table, incurring a greater latency.

At 130, the method comprises, for each descriptor, determining a latency attribute of the entity referenced by the descriptor. The latency attribute may relate or correspond to an impact of accessing the entity referenced by the descriptor on an overall latency of the processing operation. In other words, the latency attribute may relate or correspond to a proportion of the overall latency of the processing operation that may be attributable to accessing the entity referenced by the descriptor. For example, an entity that is accessed a large number of times during a processing operation may have a high impact on the overall latency of the processing operation; a significant proportion of the overall processing latency may be attributable to accessing that entity. The latency attribute may reflect that large impact.

Conversely, an entity that is accessed a small number of times, or not at all, during a processing operation may have a low impact on the overall latency of the processing operation; an insignificant proportion of the overall processing latency may be attributable to accessing that entity. The latency attribute may reflect that low impact.

Accordingly, a latency attribute of an entity may correspond or relate to a number of times during a computation that that entity may be accessed, or an access frequency. Such an access frequency may be estimated during determination of a latency attribute. Alternatively, a proxy for frequency of access may be identified. In particular, a source of the entity, e.g., the user or the computation, or a permanence of the entity, e.g., permanent or transient, may be used to estimate access frequency.

In some embodiments, the latency attribute corresponds to the source of the entity. In this case, input and output buffers are supplied by the user. By nature, these buffers are accessed just once during a processing operation. Accordingly, the frequency of access of these buffers is low and latency incurred by accessing them may have a low impact on the overall latency of the processing operation. Buffers storing data used during processing, for example weights of a neural network, may be accessed a greater number of times during a processing operation. Accordingly, the frequency of access of these buffers is relatively high and latency incurred by accessing them may have a high impact on the overall latency of the processing operation. In this way, entity source may be used as a proxy for access frequency.

At 140, the method comprises, for each descriptor, arranging the descriptor in the hierarchical access structure according to the latency attribute such that processing latency of the processing operation is reduced. For example, a descriptor referencing an entity having a latency attribute indicating a high impact on the overall latency of the processing operation may be arranged in a first tier of the hierarchical access structure, while a descriptor referencing an entity having a latency attribute indicating a low impact on the overall latency of the processing operation may be arranged in a second tier of the hierarchical access structure. In this way, an entity associated with a high impact on overall latency may be arranged to be accessed via a low latency route. Similarly, an entity associated with a low impact on overall latency may be arranged to be accessed via a high latency route.

Accordingly, the descriptors are arranged in storage such that the most frequently accessed descriptors are accessible via a minimum number of memory accesses, preferably only one each, and the least frequently accessed descriptors are accessible via a greater number of memory accesses to provide a hierarchical structure of descriptors arranged according to a latency attribute to provide a low latency system that is computationally inexpensive, flexible and API compatible.

Figure 2:
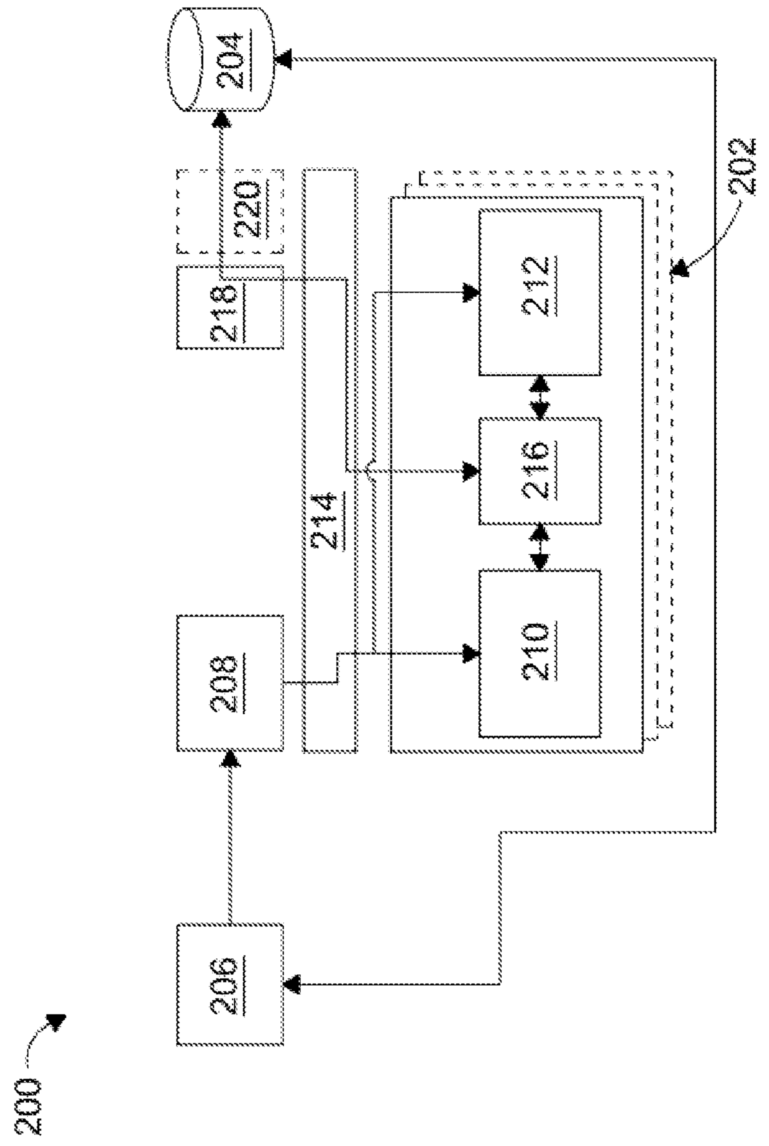
FIG. 2 illustrates a schematic diagram of a processing system comprising a processing resource according to a further implementation of present techniques.

Turning now to FIG. 2, a schematic diagram of a processing system 200 comprising a processing resource 202 according to a further implementation of present techniques is illustrated. The processing system 200 further comprises storage 204 and a command stream frontend 208. The processing resource 202 may be shader cores of a graphics processing unit. The storage 204 may be dynamic random-access memory (DRAM).

The system 200 comprises a driver 206, a software entity, configured to be executed on a host processing unit. The driver 206 receives a logical graph from a user describing a processing operation, for example instructions to create a neural network. The driver 206 also receives from the user descriptors comprising address and attribute information of buffers allocated in storage 204 for inputs and outputs of the processing operation. The driver 206 may comprise a kernel driver, a userspace drive or any combination of such drivers.

In response, the driver 206 allocates buffers in storage 204 to store data required to perform the processing operation and generates descriptors to the buffers to enable access by the processor 202. The driver 206 arranges the descriptors in a hierarchical access structure according to a latency attribute of each descriptor. The driver 206 may populate at least some of the buffers with data. In addition, the driver 206 creates a command buffer and populates the command buffer with instructions for the hardware of the processing system to perform the processing operation. The driver 206 provides a pointer to the command buffer to the command stream frontend 208.

The command stream frontend 208, a hardware entity of the processing system 200, accesses the command buffer via the pointer provided by the driver 206 before reading and executing the instructions in the command buffer. The command stream frontend 208 delegates tasks of the processing operation between a plurality of engines 210, 212. The tasks may be interleaved between the engines 210, 212 for efficiency. The engines 210, 212 may comprise execution engines, neural engines, or any combination of such engines.

The command stream frontend 208 communicates the tasks of the processing operation to the engines 210, 212 via a processing unit interconnect 214. The processing unit interconnect 214 connects network interfaces of the engines and the command stream frontend 208.

Caches 216, 218, 220 are provided to hold small quantities of data to reduce a number of memory accesses required during processing to reduce latency.

Figure 3:
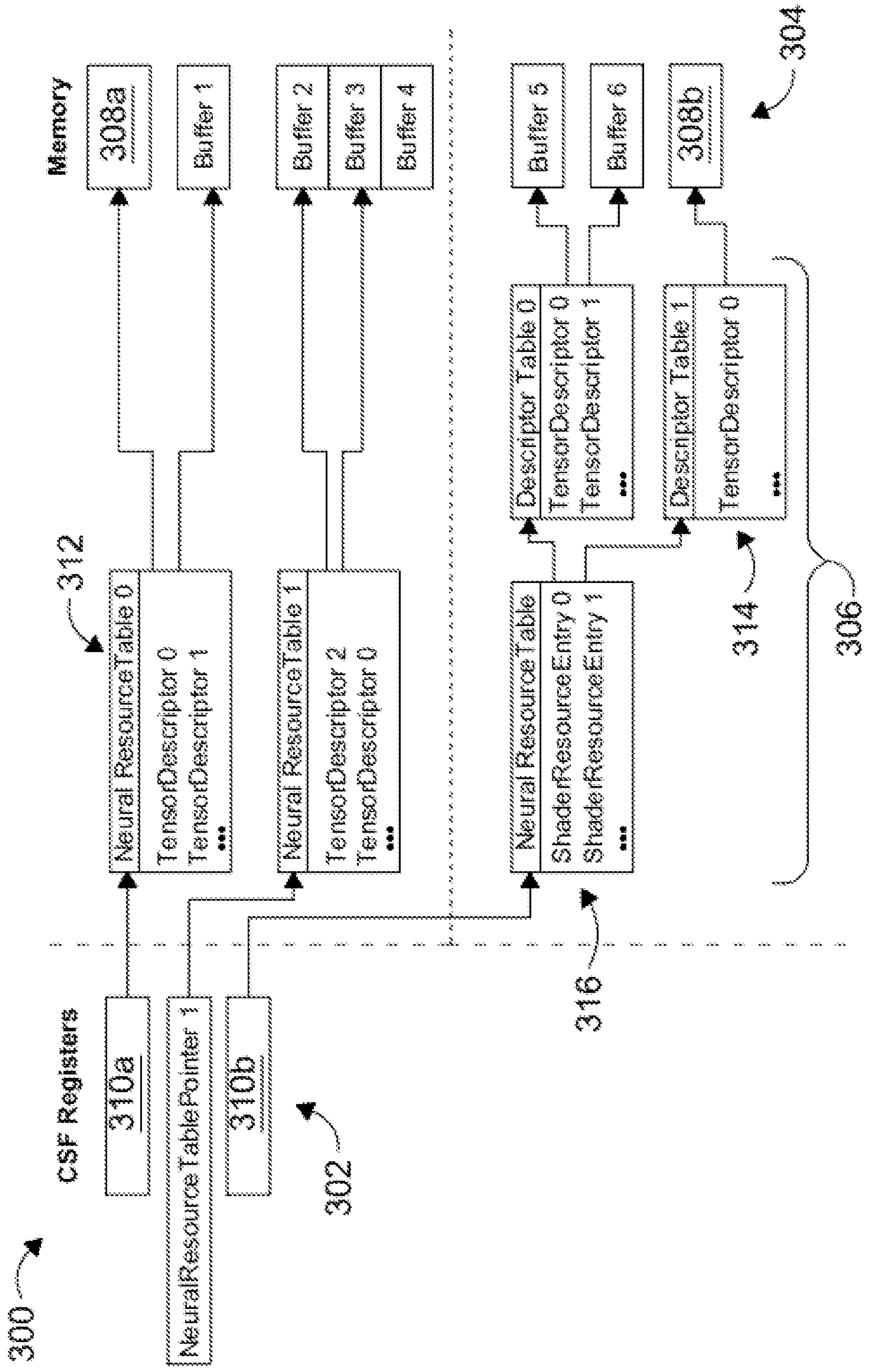
FIG. 3 illustrates a schematic view of a hierarchical access structure according to an implementation of present techniques.

FIG. 3 illustrates a schematic view of a hierarchical access structure 300 according to an implementation of present techniques. The memory access route from registers 302 of the command stream front end (208 of FIG. 2) to buffers 304 in storage (204 of FIG. 2) via descriptor tables 306 is shown.

A first buffer **308*a* in storage is accessible via a first pointer 310*a* in a register 302 of the command stream front end. The descriptor to the first buffer 308*a* is placed in a field of a first resource table 312 and the first pointer 310*a* points to that field in the first resource table 312. In this way, accessing the descriptor of the first buffer 308*a* requires one memory access. The first resource table 312 represents one level of indirection. The first buffer 308*a* is in a first tier of the hierarchical access structure 300**.

A second buffer **308*b* in storage is accessible via a second pointer 310*b* in a register 302 of the command stream front end. The descriptor to the second buffer 308*b* is placed in a field of a second resource table 314, and a descriptor to that field of the second resource table 314 is placed in a field of a third resource table 316. The second pointer 310*b* points to that field of the third resource table 316. In this way, accessing the descriptor of the first buffer 308*a* requires two memory accesses. The second resource table 314 and the third resource table 316 represent two levels of indirection. The second buffer 308*b* is in a second tier of the hierarchical access structure 300. The first tier is a higher-order tier than the second tier of the hierarchical access structure 300**.

The first buffer **308*a*** is a persistent buffer comprising data that may be required many times during a processing operation, such as weights of a neural network. One set of persistent buffers may be required per instance of a processing operation, e.g., a neural network.

Alternatively, the first buffer **308*a*** may be a transient buffer comprising data that may be required many times during a processing operation, such as results of an intermediate calculation of a neural network. One set of transient buffers may be required per session of a processing operation, e.g., a neural network.

The second buffer **308*b* is an input or output buffer, allocated by the user in the definition of the processing operation and provided to the driver (206 of FIG. 2) with the instructions to setup the processing operation. The second buffer 308*b* may be accessed once or a very few times during the processing operation. The second buffer 308*b*** may comprise input parameters of a neural network or be allocated to receive outputs of the network. One set of input or output buffers may be required per invocation of a processing operation, e.g., a neural network. Accordingly, the contents of these buffers may be changed relatively frequently by the user, requiring propagation of changes through the hierarchical access structure.

Figure 4:
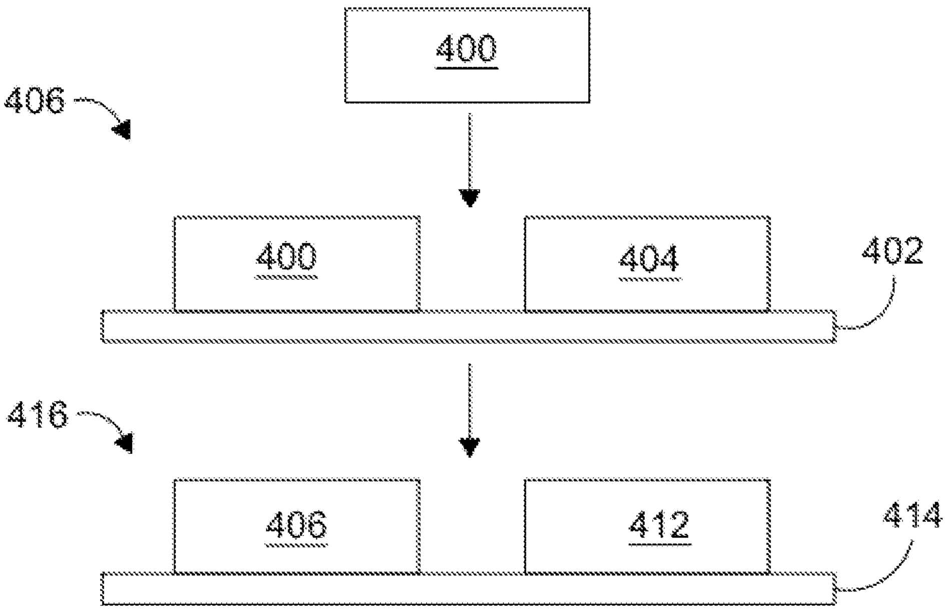
FIG. 4 shows a system and a chip-containing product.

As shown in FIG. 4, one or more packaged chips 400, with the circuitry described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the circuitry described above and connectors, such as lands, balls or pins, for connecting the semiconductor devices to an external environment. Where more than one chip 400 is provided, these could be provided as separate integrated circuits (provided as separate packages) or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e., small modular chips with particular functionality) may itself be referred to as a chip. A chiplet may be packaged individually in a semiconductor package and/or together with other chiplets into a multi-chiplet semiconductor package (e.g., using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g., plastic, glass, ceramic, or a flexible substrate material such as paper, plastic, or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g., a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

As will be appreciated by one skilled in the art, the present technology may be embodied as a method, a circuit or a computer readable medium comprising data and imperatives to cause construction of a circuit. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define an HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A computer-implemented method of arranging a set of descriptors in storage for access by a processor when executing a processing operation, the method comprising:
providing a set of descriptors;
each descriptor comprising address and attribute information for a referenced entity in storage;
providing a hierarchical access structure comprising a plurality of tiers in storage, wherein a number of memory accesses associated with accessing a first tier is less than a number of memory accesses associated with accessing a second tier;
for each descriptor, determining a latency attribute of the entity referenced by the descriptor;
the latency attribute being indicative of a relative impact of accesses of the referenced entity on the overall processing latency of the processing operation; and
for each descriptor, arranging the descriptor in the hierarchical access structure based on the latency attribute.

2. The computer-implemented method of claim 1, wherein arranging the descriptor in the hierarchical access structure based on the latency attribute comprises:
arranging the descriptor such that descriptors having latency attributes being indicative of a high relative impact of accesses of the referenced entity on the overall processing latency of the processing operation are arranged in a relatively high-order tier; and
descriptors having latency attributes being indicative of a low relative impact of accesses of the referenced entity on the overall processing latency of the processing operation are arranged in a relatively low-order tier.

3. The computer-implemented method of claim 1, wherein the processing latency associated with accessing a tier of the hierarchical access structure is correlated with a number of memory accesses required to access said tier.

4. The computer-implemented method of claim 1, wherein frequently accessed descriptors are arranged in first tiers of the hierarchical access structure.

5. The computer-implemented method of claim 1, wherein the latency attribute is an estimated access frequency of the entity.

6. The computer-implemented method of claim 1, wherein the latency attribute is a source of the entity.

7. The computer-implemented method of claim 1, wherein the latency attribute is a permanence of the entity.

8. The computer-implemented method of claim 1, wherein the hierarchical access structure comprises a plurality of resource tables configured to comprise descriptors.

9. The computer-implemented method of claim 8, wherein providing a hierarchical access structure comprises:
providing a plurality of resource tables;
allocating a first resource table to a first access tier;
allocating a second resource table to the first access tier;
populating the second resource table with descriptors of fields of a third resource table to allocate the third resource table to a second access tier.

10. The computer-implemented method of claim 9, wherein, for a referenced entity having a latency attribute above a predetermined threshold, the descriptor is arranged in the first resource table.

11. The computer-implemented method of claim 9, wherein, for a referenced entity having a latency attribute below a predetermined threshold, the descriptor is arranged in the third resource table.

12. Computer-readable instructions stored in non-transitory computer-readable memory to arrange a set of descriptors in storage for access by a processor when executing a processing operation according to the method of claim 1.

13. A non-transitory computer-readable medium to store computer-readable code for fabrication of circuitry for arranging a descriptor in storage according to claim 1.

14. A host processor configured to execute a driver to arrange a set of descriptors in storage for access by a processor when executing a processing operation; the driver being configured to:
provide a set of descriptors of a processing operation;
each descriptor comprising address and attribute information for a referenced entity in storage;
provide a hierarchical access structure comprising a plurality of tiers in storage, wherein a number of memory accesses associated with accessing a first tier is less than a number of memory accesses associated with accessing a second tier,
for each descriptor, determine a latency attribute of the entity referenced by the descriptor;
the latency attribute being indicative of a relative impact of accesses of the referenced entity on the overall processing latency of the processing operation; and
for each descriptor, arrange the descriptor in the hierarchical access structure based on the latency attribute.

* * * * *